US009191579B2

(12) United States Patent
Seidel et al.

(10) Patent No.: US 9,191,579 B2
(45) Date of Patent: Nov. 17, 2015

(54) COMPUTER-IMPLEMENTED METHOD AND APPARATUS FOR TRACKING AND RESHAPING A HUMAN SHAPED FIGURE IN A DIGITAL WORLD VIDEO

(75) Inventors: Hans-Peter Seidel, Saarbrücken (DE); Christian Theobalt, Saarbrücken (DE); Thorsten Thormaehlen, Saarbrücken (DE); Arjun Jain, Saarbrücken (DE)

(73) Assignee: MAX-PLANCK-GESELLSCHAFT ZUR FORDERUNG DER WISSENSCHAFTEN, Munich (DE)

( * ) Notice: Subject to any disclaimer, the term of this patent is extended or adjusted under 35 U.S.C. 154(b) by 0 days.

(21) Appl. No.: 13/823,813

(22) PCT Filed: Nov. 29, 2011

(86) PCT No.: PCT/EP2011/071247
§ 371 (c)(1),
(2), (4) Date: Jun. 4, 2013

(87) PCT Pub. No.: WO2012/072617
PCT Pub. Date: Jun. 7, 2012

(65) Prior Publication Data
US 2013/0330060 A1 Dec. 12, 2013

Related U.S. Application Data

(60) Provisional application No. 61/417,654, filed on Nov. 29, 2010.

(30) Foreign Application Priority Data

Nov. 29, 2010 (EP) ..................................... 10015108

(51) Int. Cl.
*G11B 27/00* (2006.01)
*H04N 5/93* (2006.01)
*H04N 5/262* (2006.01)
*G06T 17/10* (2006.01)

(52) U.S. Cl.
CPC ................ *H04N 5/262* (2013.01); *G06T 17/10* (2013.01)

(58) Field of Classification Search
USPC .......... 345/473, 474, 679, 380, 681; 386/278, 386/280, 282
See application file for complete search history.

(56) References Cited

U.S. PATENT DOCUMENTS

| | | | |
|---|---|---|---|
| 6,208,360 B1 * | 3/2001 | Doi et al. ...................... | 345/474 |
| 7,027,054 B1 * | 4/2006 | Cheiky et al. ................. | 345/473 |
| 7,650,058 B1 * | 1/2010 | Garoutte ....................... | 386/326 |
| 8,659,594 B2 * | 2/2014 | Kim et al. ..................... | 345/419 |

(Continued)

OTHER PUBLICATIONS

"Automatic Conversion of Mesh Animations into Skeleton-based Animations", Edilson de Aguiar et al, 2008, vol. 27.*

(Continued)

*Primary Examiner* — Daquan Zhao
(74) *Attorney, Agent, or Firm* — Siritzky Law, PLLC

(57) ABSTRACT

The invention concerns a computer-implemented method for tracking and reshaping a human-shaped figure in a digital video comprising the steps: acquiring a body model of the figure from the digital video, adapting a shape of the body model, modifying frames of the digital video, based on the adapted body model and outputting the digital video.

16 Claims, 5 Drawing Sheets

(56) References Cited

U.S. PATENT DOCUMENTS

| | | | |
|---|---|---|---|
| 8,699,857 B2* | 4/2014 | Nonaka et al. | 386/280 |
| 8,749,556 B2* | 6/2014 | de Aguiar et al. | 345/473 |
| 8,761,580 B2* | 6/2014 | Gausereide | 386/278 |
| 2001/0050689 A1* | 12/2001 | Park | 345/629 |
| 2007/0036434 A1* | 2/2007 | Saveliev | 382/173 |
| 2007/0133880 A1* | 6/2007 | Sun et al. | 382/195 |
| 2008/0033803 A1* | 2/2008 | McKenna et al. | 705/14 |
| 2010/0111370 A1* | 5/2010 | Black et al. | 382/111 |
| 2010/0149179 A1* | 6/2010 | de Aguiar et al. | 345/420 |
| 2011/0064388 A1* | 3/2011 | Brown et al. | 386/285 |
| 2011/0148875 A1* | 6/2011 | Kim et al. | 345/420 |
| 2012/0162218 A1* | 6/2012 | Kim et al. | 345/419 |

OTHER PUBLICATIONS

"Real-time 3D shape reconstruction, dynamic 3D mesh deformation, and high fidelity visualization for 3D video", T. Matsuyama et al, Jul. 2004.*

Matsuyama, T. et al., "Realtime 3D shape reconstruction, dynamic 3D mesh deformation, and high fidelity visualization for 3D video" Computer Vision and Image Understanding 96 (2004) 393-434, Elsevier Inc. 2004.

Park, Sang Il et al., "Capturing and Animating Skin Deformation in Human Motion" Association for Computing Machinery, Inc., 0730-0301/06/0700-0881, 2006.

PCT/EP2011/071247—Jan. 3, 2012 WIPO International Search Report.

* cited by examiner

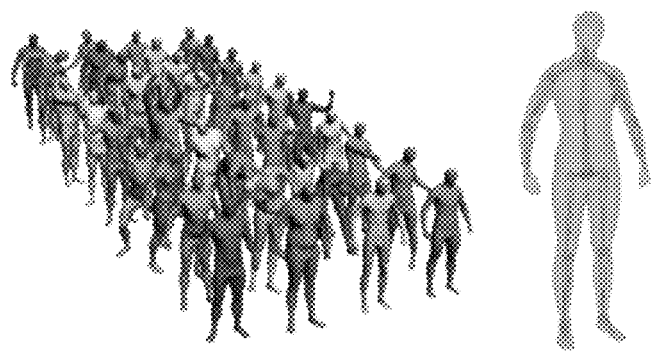
Fig. 3(a)  Fig. 3(b)
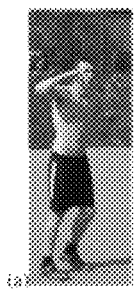  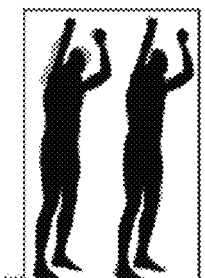 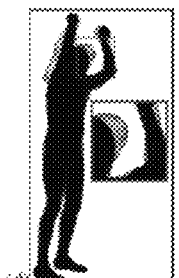 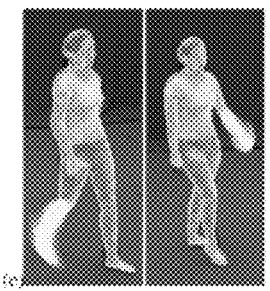
Fig. 4(a)  Fig. 4(b)  Fig. 4(c)  Fig. 4(d)  Fig. 4(e)
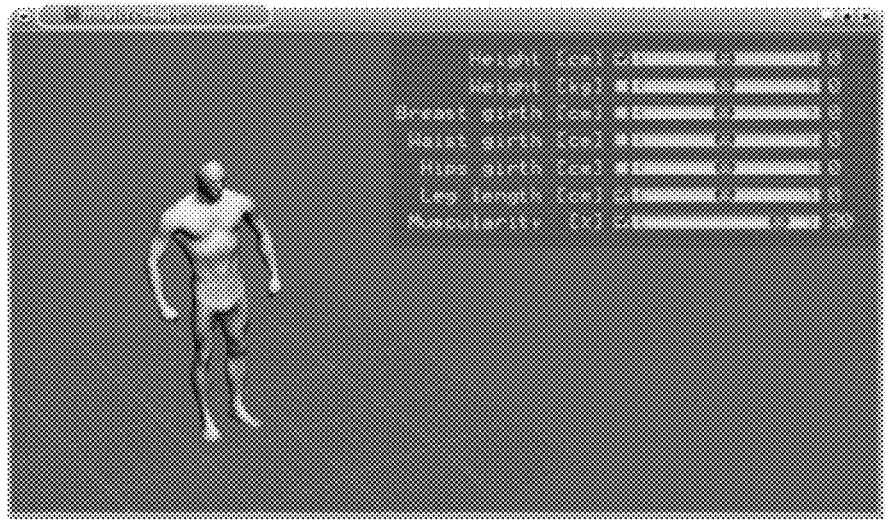
Fig. 5

COMPUTER-IMPLEMENTED METHOD AND APPARATUS FOR TRACKING AND RESHAPING A HUMAN SHAPED FIGURE IN A DIGITAL WORLD VIDEO

TECHNICAL BACKGROUND

Digital retouching of photographs is an essential operation in commercial photography for advertisements or magazines, but is also increasingly popular among hobby photographers. Typical retouching operations aim for visual perfection, for instance by removing scars or birthmarks, adjusting lighting, changing scene backgrounds, or adjusting body proportions. However, even commercial-grade image editing tools often only provide very basic manipulation functionality. Therefore, many advanced retouching operations, such as changing the appearance or proportions of the body, often require hours of manual work. To facilitate such advanced editing operations, researchers have developed semantically-based retouching tools that employ parametric models of faces and human bodies in order to perform complicated edits more easily. Examples are algorithms to increase the attractiveness of a face, or to semi-automatically change the shape of a person in a photograph.

While such semantically-based retouching of photographs is already very challenging, performing similar edits on video streams has almost been impossible up to now. Existing commercial video editing tools only provide comparatively basic manipulation functions, such as video object segmentation or video retargeting, and already these operations are computationally very demanding. Only a few object-based video manipulation approaches go slightly beyond these limits, for instance by allowing facial expression change, modification of clothing texture, or by enabling simple motion edits of video objects. The possibility to easily manipulate attributes of human body shape, such as weight, height or muscularity, would have many immediate applications in movie and video post-production. Unfortunately, even with the most advanced object-based video manipulation tools, such retouching would take even skilled video professionals several hours of work. The primary challenge is that body shape manipulation, even in a single video frame, has to be performed in a holistic way. Since the appearance of the entire body is strongly correlated, body reshaping solely based on local operations is very hard. As an additional difficulty, body reshaping in video has to be done in a spatio-temporally coherent manner.

PRIOR ART

Several commercial-grade image manipulation tools enable a variety of basic video retouching operations, such as segmentation, local shape editing, or compositing. Unfortunately, more advanced image edits are very cumbersome with the aforementioned approaches. A solution is offered by semantically-guided image operations, in which some form of scene model represents and constrains the space of permitted edits, such as a face model for automatic face beautification, or a body model for altering body attributes in photographs.

Applying similarly complex edits to entire video streams is still a major challenge. Previous approaches include a system that allows the user to shear and warp the video volumes, for instance to stabilize the camera or remove certain objects; also known is an algorithm for amplification of apparent motions in image sequences captured by a static camera and a cartoon animation filter that may alter motions in existing video footage such that it appears more exaggerated or animated.

Spatiotemporal gradient domain editing enables several advanced video effects, such as re-compositing or face replacement, at least if the faces remain static. Spatiotemporal segmentation of certain foreground objects in video streams also paves the trail for some more advanced edits, such as repositioning of the object in the field of view. However, none of these methods enables complete reshaping of human actors in an easy way.

It is therefore an object of the invention to provide methods and an apparatus for tracking and reshaping a human-shaped figure in a digital video.

SUMMARY OF THE INVENTION

This object is achieved by a method and apparatus according to the independent claims. Advantageous embodiments are defined in the dependent claims.

The invention provides a system for quick and easy manipulation of the body shape and proportions of a human actor in arbitrary video footage. More particularly, the invention proposes a method and a device to easily perform holistic manipulations of body attributes of human actors in video. The inventive method is based on a 3D morphable model of human shape and pose that has been learned from full body scans of real individuals, e.g. laser scans. Any form of parametric or non-parametric shape or geometry model may be used which enables the modification of shape or pose or both of them at the same time. The model may comprise a skeleton and a surface mesh. Pose variation of the model may be described via a standard surface skinning approach. The variation of the body shape across age, gender and personal constitution may be modeled in a low-dimensional principal-component-analysis (PCA) parameter space. Alternative parametric shape models may be based on other parameterization techniques, such as any other dimensionality reduction technique (Isomap, Kernel PCA etc.). Shape manipulation may be based on modifications of shape parameters in these parametric spaces or on parameters that are mapped to these spaces through learned or defined mappings. Alternatively, general scaling, deformation or manipulation methods for shape models may be used to modify the shape or pose of the body. A regression scheme allows mapping features of the human shape model onto semantically meaningful scalar attributes that may be modified by the user, such as: height, waist girth, breast girth, muscularity, etc. In a first step, a marker-less motion estimation approach may fit the model to the actor in each video frame. In difficult poses, the user may support the algorithm with manual constraint placement. Once the 3D model is tracked, the user may interactively modify its shape attributes. By means of an image-based warping approach, the modified shape of the model may be applied to the actor in each video frame in a spatiotemporally coheren fashion. By this means, one may now conveniently perform spatiotemporal reshaping of human actors in video footage.

The inventive approach is suitable for both monocular and multi-view pose inference.

The usefulness of the invention may be illustrated on single-view and multi-view video sequences. For instance, one may quickly and easily alter the appearance of actors in existing movie and video footage. Further on, one may alter the physical attributes of actors captured in a controlled multi-view video studio. This allows careful planning of desired camera viewpoints for proper compositing with a virtual background, while providing the ability to arbitrarily retouch the shape of the actor during post-processing. The high visual fidelity of the results was also confirmed in a user study.

BRIEF DESCRIPTION OF THE DRAWINGS

These and further aspects and advantages of the present invention will become more apparent when considering the following detailed description of the invention, in connection with the drawing, in which

FIGS. 3(a)-3(b) show a morphable body model: 3(a) Samples of the pose and shape parameter space that is spanned by the model and 3(b) The average human shape with the embedded kinematic skeleton.

FIGS. 4(a)-4(d) show components of the pose error function: 4(a) KLT features and their trajectories (yellow) over several frames; 4(b) in the monocular video case, additional feature point tracks may be manually generated or broken trajectories may be linked; 4(c) silhouette error term used during global optimization; a sum of image silhouette pixels not covered by the model, and vice versa (erroneous pixels in dark grey), 4(d) silhouette error term used during local optimization—corresponding points between image and model silhouettes and their distances are shown; 4(e) Global pose optimization: sampled particles (model pose hypotheses) are overlaid for the leg and the arm.

FIG. 5 shows a reshaping interface according to an embodiment of the invention that allows a user to modify semantic shape attributes of a person.

DETAILED DESCRIPTION OF THE INVENTION

Figure 2:
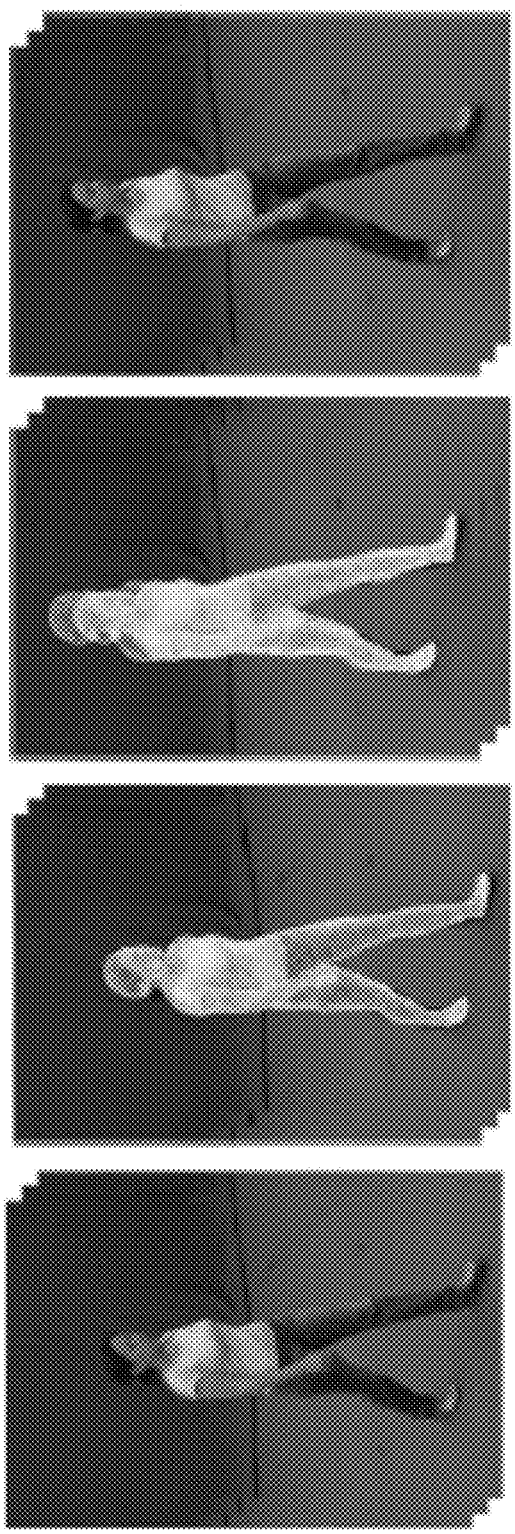
FIG. 2 shows the two central processing steps of an embodiment of the inventive system for tracking and reshaping a morphable 3D human model.

The inventive system takes as input a single-view or multi-view video sequence with footage of a human actor to be spatiotemporally reshaped (FIG. 2). There is no specific requirement on the type of scene, type of camera, or appearance of the background. In a first step, the silhouette of the actor in the video footage is segmented using off-the-shelf video processing tools.

The second step in the pipeline is marker-less model fitting. There, both the shape and the pose parameters of the 3D model are optimized such that it re-projects optimally into the silhouette of the actor in each video frame, as will be explained later on. Once the model is tracked, the shape parameters of the actor may be modified by simply tweaking a set of sliders corresponding to individual semantic shape attributes. Since the original PCA parameter dimensions of the morphable shape model do not directly correspond to plausible shape attributes, one may learn a mapping from intuitive attributes, such as muscularity or weight, to the underlying PCA space, as will also be explained. Now reshaping may be performed by adjusting plausible parameter values. Once the target set of shape attributes has been decided on, they are applied to the actor in all frames of the video input by performing image-based warping under the influence of constraints that are derived from the re-projected modified body model, as also explained later on.

In the following, the details of the 3D human shape model are reviewed and it is explained how it may be used for tracking the actor in a digital video.

3D Morphable Body Model

In order to represent the pose and the body proportions of an actor in 3D, a variant of the SCAPE model (ANGUELOV, D., SRINIVASAN, P., KOLLER; D., THRUN, S., RODGERS, J., AND DAVIS, J. 2005. "SCAPE: Shape completion and animation of people". In ACM TOG (Proc. SIGGRAPH '05)) may be employed in one embodiment of the invention. The model may be learned from a publicly available database of 550 registered body scans of over 100 people (roughly 50% male subjects, and 50% female subjects, aged 17 to 61) in different poses (FIG. 3(a)). The motion of the model may be represented via a kinematic skeleton comprising of 15 joints. The surface of the model may consist of a triangle mesh with roughly 6500 3D vertices $v_i$. As opposed to the original SCAPE model, one does not need to learn per triangle transformation matrices to represent subject-specific models of pose-dependent surface deformation. In the embodiment of the invention presented here, this level of detail is not required to obtain realistic reshaping results. Further on, the omission of this per-triangle model component obviates the need of solving a large linear system to reconstruct the model surface, every time the model parameters have changed. This, in turn, makes pose estimation orders of magnitude faster. Instead of per-triangle transformations, a normal skinning approach may be used for modeling posedependent surface adaptation. To this end, the skeleton may be rigged into the average shape human shape model by a professional animation artist (FIG. 3(b)).

Similar to the original SCAPE model, shape variation across individuals may be represented via principal component analysis (PCA). The first 20 PCA components may capture 97% of the body shape variation. In total, the model thus has N=28 pose parameters $\Phi=(\phi_1, \ldots \phi_N)$ and M=20 parameters $\Lambda=(\lambda_1, \ldots \lambda_M)$ to represent the body shape variation.

Marker-Less Tracking

A marker-less motion capture approach may be used to fit the pose and shape of the body model to a human actor in each frame of a single view or multi-view video sequence. In case the input is an arbitrary monocular video sequence, the simplifying assumption may be made that the recording camera is faithfully modeled by a scaled orthographic projection. In the multi-view video case one may expect fully calibrated frame-synchronized cameras, which is a reasonable assumption to make as most of these sequences are captured under controlled studio conditions.

Henceforth, a video frame at time stamp t seen from camera c (c=1, . . . , C) is denoted by $I_{t,c}$. Before tracking commences, the person is segmented from the background in each video frame, yielding a foreground silhouette. To serve this purpose, one may rely on standard video processing tools (e.g, Mocha, Adobe After-Effects, etc.) if chroma-keying is not possible, but note that alternative video object segmentation approaches, such as [Wang et al. 2005; Li et al. 2005], would be equally applicable.

The inventive motion capture scheme infers pose and shape parameters by minimizing an image-based error function $E(\Phi, \Lambda, t)$ that, at each time step of video t, penalizes misalignment between the 3D body model and its projection into each frame:

$$E(\Phi_t, \Lambda_t) = \sum_{c=1}^{C} E_s(\Phi, \Lambda_t, I_{t,c}) + E_f(\Phi_t, \Lambda_t, I_{t,c}). \quad (1)$$

The first component $E_s$ measures the misalignment of the silhouette boundary of the re-projected model with the silhouette boundary of the segmented person. The second component $E_f$ measures the sum of distances in the image plane between feature points of the person tracked over time, and the re-projected 3D vertex locations of the model that—in the previous frame of video—corresponded to the respective feature point. Feature trajectories may be computed for the entire set of video frames before tracking commences (FIG. 4(a)). To this end, an automatic Kanade-Lucas-Tomasi (KLT) feature point detector and tracker may be applied to each video frame. Automatic feature detection alone is often not sufficient, in particular if the input is a monocular video: Trajectories easily break due to self-occlusion, or feature points may not have been automatically found for body parts that are important but contain only moderate amounts of texture. One may therefore provide an interface in which the user may explicitly mark additional image points to be tracked, and in which broken trajectories may be linked (FIG. 4(b)).

Pose inference at each time step t of a video is initialized with the pose parameters $\Phi_{t-1}$ and shape parameters $\Lambda_{t-1}$ determined in the preceding time step. For finding $\Phi_t$ and $\Lambda_t$ one may adapt the combined local and global pose optimization scheme by Gall et al. (GALL, J., STOLL, C., DE AGUIAR, E., THEOBALT, C., ROSENHAHN, B., AND SEIDEL, H.-P. 2009. Motion capture using simultaneous skeleton tracking and surface estimation. In Proc. IEEE CVPR).

Given a set of K 3D points $v_i$ on the model surface and their corresponding locations in the video frame $u_{i,c}$ at time t in camera c (these pairs are determined during evaluation of the silhouette and feature point error), a fast local optimization is first performed to determine the pose parameters of each body part. During local optimization, $E_s$ in Eq. (1) is computed by assigning a set of points on the model silhouette to the corresponding closest points on the image silhouette, and summing up the 2D distances (FIG. 4(c)).

Each 2D point $u_{i,c}$ defines a projection ray that may be represented as a Plücker line $L_{i,c}=(n_{i,c}; m_{i,c})$ [Stolfi 1991].

The error of pair $(\Gamma(\Phi_t, \Lambda_t)v_i, u_{i,c})$ is given by the norm of the perpendicular vector between the line $L_i$ and the 3D point $v_i$ from the body models standard pose, transformed by transformation $\Gamma(\Phi_t, \Lambda_t)$ that concatenates the pose, shape, and skinning transforms. Finding the nearest local pose and shape optimum of Eq. (1) therefore corresponds to solving $$\operatorname*{argmin}_{(\Phi_t, \Lambda_t)} \sum_c^C \left( \sum_i^K w_i \right) \left\| \prod_i (\mathcal{T}(\Phi_t, \Lambda_t)v_{i,c}) \times n_{i,c} - m_{i,c} \right\|_2^2 \quad (2)$$

which is linearized using Taylor approximation and solved iteratively. H is the projection from homogeneous to non-homogeneous coordinates.

Local pose optimization is extremely fast but may in some cases get stuck in incorrect local minima. Such pose errors could be prevented by running a full global pose optimization. However, global pose inference is prohibitively slow when performed on the entire pose and shape space. One may therefore perform global pose optimization only for those sub-chains of the kinematic model, which are incorrectly fitted. Errors in the local optimization result manifest through a limb-specific fitting error $E(\Phi_t, \Lambda_t)$ that lies above a threshold. For global optimization, one may utilize a particle filter. FIG. 4(d) overlays the sampled particles (pose hypotheses) for the leg and the arm.

In practice, one may solve for pose and shape parameters in a hierarchical way. First, one may solve for both shape and pose using only a subset of key frames of the video in which the actor shows a sufficient range pose and shape deformation. It turned out that in all the test sequences the first 20 frames form a suitable subset of frames. In this first optimization stage, one may solely perform global pose and shape optimization and no local optimization. Thereafter, one may keep the shape parameters fixed, and subsequently solve for the pose in all frame using the combined local and global optimization scheme.

One may employ the same tracking framework for both multi-view (C>1) and single view video sequences (C=1). While multi-view data may be tracked fully-automatically, single view data may need more frequent manual intervention. In all the monocular test sequences, though, only a few minutes of manual user interaction were needed. Please note that monocular pose tracking is ill-posed, and therefore one cannot guarantee that the reconstructed model pose and shape are correct in a metric sense. However, in the retouching application presented here such 3D pose errors may be tolerated as long as the re-projected model consistently overlaps with the person in all video frames. Also, for the purpose presented here it is not essential that the re-projected model aligns exactly with the contours of the actor. The image-based warping deformation described in the following also succeeds in the presence of small misalignments.

Reshaping Interface

Once tracking information for shape and pose has been obtained, the body shape of the actor may be changed with the interactive reshaping interface (see FIG. 5).

Deformation of Human Shape

The PCA shape space parameters A do not correspond to semantically meaningful dimensions of human constitution. The modification of a single PCA parameter $\lambda_k$ will simultaneously modify a combination of shape aspects that one may find intuitively plausible, such as weight or strength of muscles. One may therefore remap the PCA parameters onto meaningful scalar dimensions. Fortunately, the scan database from which one may learn the PCA model contains for each test subject a set of semantically meaningful attributes, including: height, weight, breast girth, waist girth, hips girth, leg length, and muscularity. All attributes are given in their respective measurement units, as shown in FIG. 5.

Similar to Allen et al. (ALLEN, B., CURLESS, B., AND POPOVI'C, Z. 2003. "The space of human body shapes: reconstruction and parameterization from range scans". In Proc. ACM SIGGRAPH '03, 587-594) one may project the Q=7 semantic dimensions onto the M PCA space dimensions by constructing a linear mapping $S \in M((M-1) \times (Q+1))$ between these two spaces:

$$S[f_1 \ldots f_Q 1]^T = \Lambda \quad (3)$$

where $f_i$ are the semantic attribute values of an individual, and $\Lambda$ are the corresponding PCA coefficients. This mapping enables us to specify offset values for each semantic attribute $\Delta f = [\Delta f_1 \ldots \Delta f_Q 0]^T$. By this means one may prescribe by how much each attribute value of a specific person that was tracked should be altered. For instance, one may specify that the weight of the person shall increase by a certain amount of kilograms. The offset feature values translate into offset PCA parameters $\Delta \Lambda = S \Delta f$ that must be added to the original PCA coefficients of the person to complete the edit.

Certain semantic attributes are implicitly correlated to each other. For instance, increasing a woman's height may also lead to a gradual gender change since men are typically taller than women. In an editing scenario, such side-effects may be undesirable, even if they would be considered as generally plausible. In the end, it is a question of personal taste which correlations should be allowed to manifest and which ones should be explicitly suppressed. One may give the user control over this decision and give him the possibility to explicitly fix or let free certain attribute dimensions when performing an edit. To start with, for any attribute value the reshaping interface provides reasonable suggestions of what parameters to fix when modifying certain attributes individually. For instance, one suggestion is that when editing the height, the waist girth should be preserved.

Consistent Video Deformation

The inventive reshaping interface allows the user to generate a desired 3D target shape $\Lambda' = \Delta \Lambda + \Lambda$ from the estimated 3D source shape $\Lambda$ (remember that $\Lambda$ is constant in all frames after tracking has terminated). This change may be applied automatically to all the images of the sequence. In the system the user-selected 3D shape change provides the input for a meshless moving least squares (MLS) image deformation, which was introduced by Muller et al. (MULLER, M., HEIDELBERGER, B., TESCHNER, M., AND GROSS, M. 2005. Meshless deformations based on shape matching. ACM TOG 24, 3, 471-478) and Schaefer et al. (SCHAEFER, S., MCPHAIL, T., AND WARREN, J. 2006. Image deformation using moving least squares. ACM TOG 25, 3, 533-540).

Figure 6:
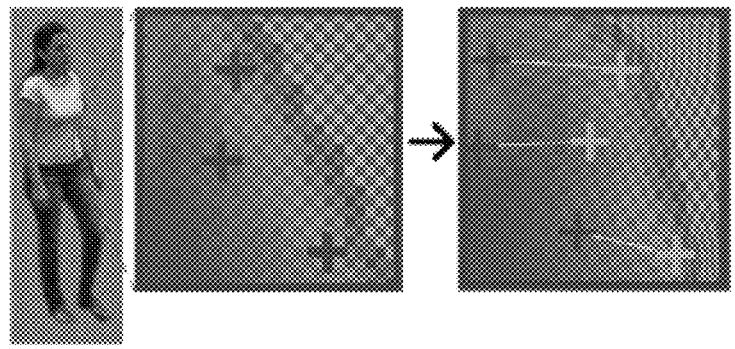
FIG. 6 is an illustration of the MLS-based warping of the actor's shape. The zoomed in region shows the projected deformation constraints in the source model configuration (left), and in the target model configuration (right). The red points show the source constraint positions, the green points the target positions. The image is warped to fulfill the target constraints.

The 2D deformation constraints for MLS image deformation are generated by employing a sparse subset S of all surface vertices $v_i$ of the body model. This set S is defined once manually for the morphable body model. One may select approx. 5 to 10 vertices per body part making sure that the resulting 2D MLS constraints are well distributed from all possible camera perspectives. This selection of a subset of vertices is done only once and then kept unchanged for all scenes. In the following, the warping process is illustrated using a single frame of video (FIG. 6). To start with, each vertex in S is transformed from the standard model pose into the pose and shape of the source body, i.e., the model in the pose and shape as it was found by the tracking approach. Afterwards, the vertex is projected into the current camera image, resulting in the source 2D deformation point $s_i$. Then, each subset vertex is transformed into the pose and shape of the target body—i.e., the body with the altered shape attributes—and projected in the camera image to obtain the target 2D deformation points $t_i$:

$$s_i = P_t(T(\Phi_t, \Lambda) v_i)$$

$$t_i = P_t(T(\Phi_t, \Lambda) v_i), \quad (4)$$

where $P_t$ denotes the projection in the current camera image at time t.

Given the deformation constraints $s_i \rightarrow t_i$, MLS deformation finds for each pixel x in the image the optimal 2D transformation $M_x$ to transform the pixel to its new location $x' = M_x(x)$. Thereby, the following cost function is minimized:

$$\underset{M_x}{\operatorname{argmin}} \sum_{s_i, t_i \in S} \frac{1}{|x - s_i|^2} (M_x(s_i) - t_i)^2. \quad (5)$$

The closed-form solution to this minimization problem is given in Müller et al. (cited above). The inventive system calculates the optimal 2D deformation in parallel for all pixels of the image using a fragment shader on the GPU. This allows the user of the reshaping interface to have an immediate What-You-See-Is-What-You-Get-feedback when a semantic shape attribute is changed. In practice, the user decides on the appropriate reshaping parameters by inspecting a single frame of video (typically the first one) in the interface.

Figure 7:
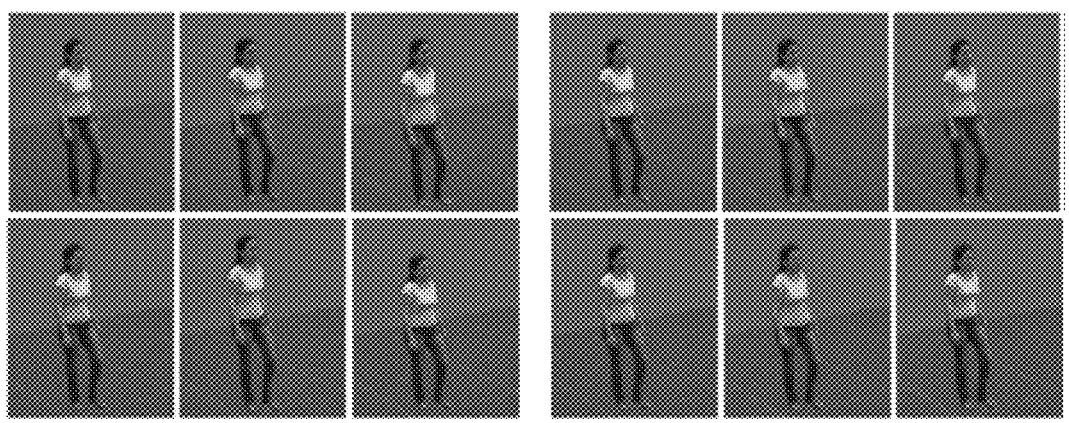
FIG. 7 shows a variety of reshaping results obtained by modifying several shape attributes of the same actor.

FIG. 7 shows a variety of attribute modifications on the same actor. Once the user is satisfied with the new shape, the warping procedure for the entire sequence is started with a click of a button.

Results

Figure 1:
FIG. 1 shows a sequence of images from the TV series Baywatch, where the original appearance of the actor (top row) was modified such that he appears more muscular (bottom row). The edit was performed using a method/apparatus according to an embodiment of the invention by simply increasing a value on a muscularity control slider.
Figure 9:
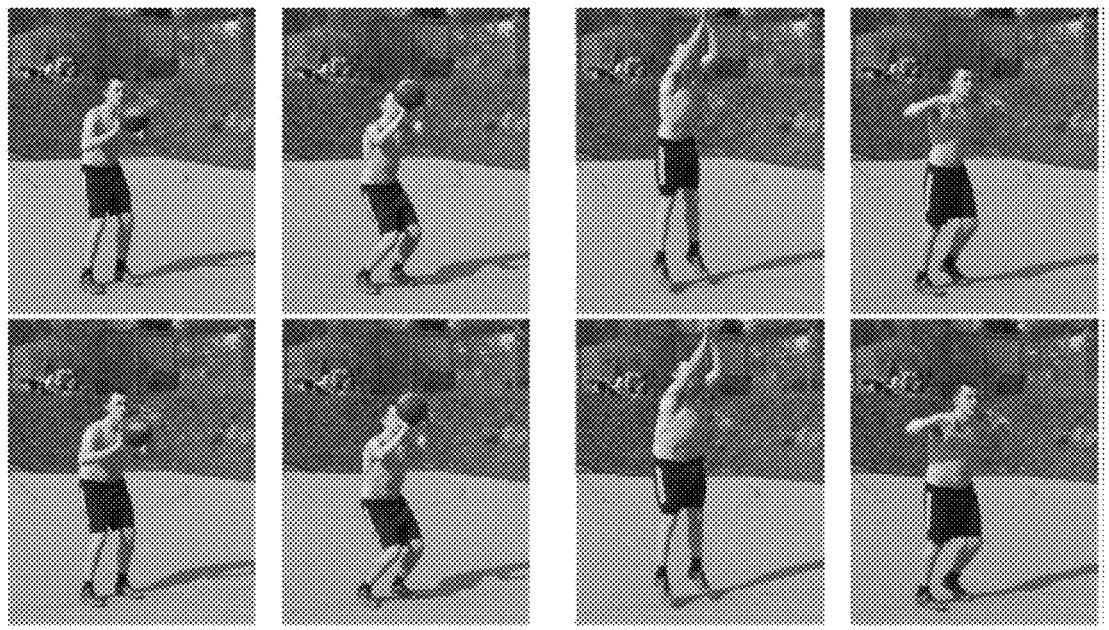
FIG. 9 shows a change of waist girth of a basketball player record-d with a single video camera - on the left, the waist girth was increased moderately; on the right the waist girth was increased way beyond a natural range, but still the deformation looks coherent and plausible.
Figures 10A, 10B, 10C:
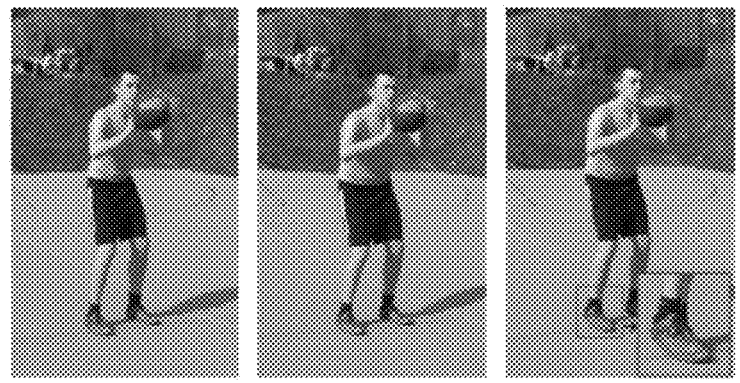
FIGS. 10(a)-10(c) show MLS-based image warping compared to segmentation based deformation. 10(a) Original Image, 10(b) Deformation using MLS-based image warping. One may notice slight artifacts in the background when the human deformation is too strong, e.g. the straight edge of the basket ball court appears curved. 10(c) Covering the background with the modified image of the segmented human often produces more objectionable artifacts, such as a double arm, double legs or shoes.

A wide variety of shape edits was performed on actors from three different video sequences: 1) a monocular sequence from the TV series Baywatch showing a man jogging on the beach (DVD quality, resolution: 720×576, 25 fps, duration 7 s), FIG. 1; 2) a monocular sequence showing a male basketball player (resolution: 1920×1080, 50 fps, duration 8 s), FIG. 9; 3) a multi-view video sequence kindly provided by the University of Surrey showing a female actor walking/sitting down in a studio (8 HD video cameras, 25 fps, blue screen background, duration 5 s), FIG. 7.

The sequences thus cover a wide range of motions, camera angles, picture formats, and real and synthetic backgrounds. The multi-view video sequence was tracked fully-automatically. In the monocular sequences, on average 1 in 39 frames needed manual user intervention, for instance the specification of some additional locations to be tracked. In neither case more than 5 minutes of user interaction were necessary. In the single-view sequences, the actor is segmented from the background using off-the-shelf tools, which takes on average 20 s per frame. All camera views in the multi-view sequence are chroma-keyed automatically.

The result figures show that the invention is able to perform a large range of semantically guided body reshaping operations on video data of many different formats that are typical in movie and video production. FIG. 7 illustrates nicely the effect of the modification of individual shape attributes of the same individual. In all cases, the resulting edits are highly realistic. In the Baywatch sequence in FIG. 1 the muscularity of the actor was increased by a significant amount. The final result looks highly convincing and consistent throughout the sequence.

Figure 8:
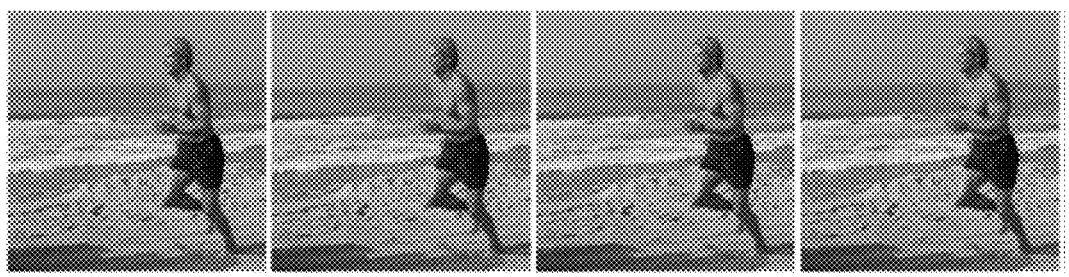
FIG. 8 shows a gradual increase of the muscularity of the Baywatch actor from his original shape (shown at the left).

FIG. 8 shows that gradual changes of the muscularity may be easily achieved.

FIG. 9 shows a basketball player filmed from a lateral angle. The inventive modification of the actor's waist girth looks very natural throughout the sequence, even for extreme edits that already lie beyond shape variations observed in reality. Overall, the modified actors look highly plausible and it is extremely hard to unveil them as video retouching results. Note that the edits are not only consistent over time, but also perspectively correct. Without an underlying 3D model such results would be hard to achieve.

The results on the multi-view data (FIG. 7) illustrate that the system is also useful when applied to footage that has been captured under very controlled studio conditions. For instance, if scene compositing is the goal, an actor may be captured on set from a variety of pre-planned camera positions in front of a blue screen. Now, with the inventive system the shape of the actor may be arbitrarily modified in any of the camera views, such that the director may decide during compositing if any shape edit is necessary. As an additional benefit, on multiview data no manual intervention is needed, except the user input defining the edit. The accompanying video shows a few examples of combined shape editing and compositing with a rendered backdrop.

Using an unoptimized implementation on an Intel Core 2 Duo CPU, @3.0 GHz it takes around 9 s per frame to track the pose of the actor in a monocular sequence, and 22 s to do the same in the multiview case. Note that tracking is only performed once for each sequence. In the reshaping tool, shape attributes may be modified in real-time, with immediate visual feedback given for the initial frame of the video. Generating the video with the new shape parameters, i.e., applying image-based warping to the entire video, takes approx. 20 ms per frame.

User Study

The method and apparatus according to the invention have been evaluated in a user study. The goal of the study was to find out if small artifacts that may be introduced by the algorithm are noticeable by a human observer. The Baywatch video (shown in FIG. 1) was presented to 30 participants. Half of the participants were shown the original video and were asked to rate the amount of visible artifacts. The other half was shown the modified video, where the running man is rendered more muscular, and were asked the same question. The participants rated the amount of visible artifacts on a 7-point Likert scale, where 1 means no artifacts and 7 very disturbing artifacts. The first group, which watched the original video, rated the amount of visible artifacts on average with $2.733 \pm 1.22$, where $\pm$ denotes the standard deviation. The modified video received only a slightly worse rating of $2.866 \pm 1.414$. This may indicate that slight artifacts are introduced by the method. This assumption was validated with a two-way analysis of variance (ANOVA). The null hypothesis that the means of the two groups are equal results in a very high p-value of 0.709 and, consequently, such a null hypothesis should not be rejected. This led to the conclusion that the amount of artifacts introduced by the method is very low and, thus, the anova analysis does not show a significant effect to reject such a null hypothesis in the experiment (on the other hand, this does not show that such a null hypothesis is true and it was proven that there are no artifacts introduced by the method).

Then, all 30 participants were shown a side-by-side comparison of the original and the modified video and asked them if they could spot the difference. 28 out of 30 participants realized that the inventors have made the running man more muscular, and only two participants thought that the inventors changed something in the background. This indicates that the system is capable of achieving a noticeable reshaping result without introducing significant artifacts.

Additional Embodiments

The invention may also be used to preview in real-time or after some off-line processing how a person moving in front of a video camera or other imaging device would look like when the body shape would be different. According to this embodiment, the video of the person moving is warped in real-time or off-line in order to see the person in a different shape.

For instance, the inventive approach may be used in a setup or measurement apparatus comprising one or several video cameras that record a person and another device that captures the motion of that person in real-time (or off-line). The statistical body model may then be fitted to the person using the video data and/or the data from the additional sensor equipment. The additional sensor equipment may, for instance, be a depth camera (Time-of-Flight or similar) or any other hardware for dynamic geometry capture and/or hardware for motion estimation. The additional hardware may also be another motion capture apparatus (e.g. optical motion capture system, electromagnetic motion capture, any form of motion capture suit or any form of exoskeleton for pose estimation, etc.). The video data and/or the additional sensors may be used to track the motion of the person either in real-time or off-line. The proposed video morphing algorithm would then be applied to one or several of the video streams and show the person moving with an altered body shape. Visualization of the deformed/modified video may also be done online or off-line.

More particularly, the person may move in front of a measurement apparatus comprising a real-time depth sensor (e.g. depth camera, stereo camera, structured light scanner or similar apparatus delivering 2.5D or 3D geometry in real-time or at near-real-time frame rates). The statistical body model may be fitted to the video and/or depth data. Here, the measured 2.5D or 3D data may serve as additional information that may be used by the tracking and model fitting procedures to achieve higher robustness (e.g. the 2.5D data may become part of the error function Eq. (1), but may also be used in other ways by the model fitting and tracking procedure to determine pose and shape parameters). The motion of the model may be tracked in real-time from the video and/or depth data. A user may see himself in the video stream in real-time while the body model-based video warping is applied in real-time.

The above described realizations may also be applied to several people that are jointly captured by one or several video cameras and/or the additional sensor equipment described above.

Warping Images

In yet another embodiment of the invention, the statistical model-based warping approach may also be used to warp images of people. For instance, with an apparatus as described above, the pose and body shape of any person standing in front of the setup may be measured. The statistical model may also be fitted to any single image of a person, e.g. any image from a catalogue showing a person in a certain type of apparel. The motion and shape parameters of the person standing in front of the camera may now be transferred to the model fitted to any of the images. The person in the image may now be warped to match the proportions of the person in front of the sensor setup. In addition, the motion of the person in front of the sensor setup may be transferred to the image, by making the model fitted to the image imitate the motion of the person in front of the setup.

As before, also this embodiment of the invention may be realized in an on-line or an offline scenario.

Application in Motivation Video Generation

The described method may be used to produce motivational image or video material to motivate people to achieve a certain goal regarding their body shape or fitness. Since the method may quantitatively specify changes in human body parameters (e.g. 10 kg more weight), a person may preview how he or she would look like after a weight loss, muscle gain or other changes of physical attributes.

Applications in Movie Production

For some movie productions, actors are required to alter their physical appearance, e.g. by training to gain more muscles, or by losing or gaining weight. With the inventive approach, the actor does not need to go through these changes, as they may be physically demanding. The inventive approach may simulate the desired appearance of the actor on screen, even if his true body shape and proportions do not match the desired look.

It is also feasible to apply very strong changes to the attributes of actors, e.g. by turning one actor into a dwarf, and another actor into a giant, even though they are actually of similar height in reality.

Applications in Productions of Advertisements

Different cultures or groups of people may have different preferences regarding body shapes. Often an advertisement video is specifically targeted to one cultural environment. With the proposed methods and device, a commercial or other type of promotional video may be filmed once, and different versions with differently reshaped actors may be produced afterwards to meet the expectations of different target audiences.

We claim:

1. Computer-implemented method for tracking and reshaping a human-shaped figure in a digital video comprising the steps:
    acquiring a body model of the figure from the digital video;
    adapting a shape of the body model;
    modifying frames of the digital video, based on the adapted body model; and
    outputting the digital video,
    wherein pose and shape parameters of the model are acquired by measuring the misalignment of a silhouette boundary of a re-projected model with a silhouette boundary of the figure, and
    wherein acquiring pose and shape parameters further comprises minimizing a misalignment between the figure in a video frame and the body model re-projected onto the video frame.

2. A method according to claim 1, wherein the body model comprises a kinematic skeleton model and a surface mesh.

3. A method according to claim 1, wherein the body model uses a normal skinning approach for modeling pose-dependent surface mesh adaptation.

4. A method according to claim 1, further comprising the step of providing an interface in which a user may explicitly mark additional image points to be tracked and in which broken trajectories may be linked.

5. A method according to claim 1, wherein the motion of the model is tracked in real-time from the video and/or depth data provided by an additional sensor.

6. A method according to claim 1, wherein the digital video is output in real time.

7. Use of a method according to claim 1 for visualizing a human person in a different shape.

8. Use of a method according to claim 1 for warping images of a human person, based on an image of a different human person.

9. A non-transitory computer-readable medium, storing instructions that, when executed, implement a method according to claim 1.

10. A computer-implemented method for tracking and reshaping a human-shaped figure in a digital video, the method comprising:
    providing an interface for setting shape attributes of a body model;
    wherein the shape attributes of the body model comprise at least one of height, weight, breast girth, waist girth, hips girth, leg length and muscularity;
    acquiring a body model of the figure from the digital video;
    adapting a shape of the body model, wherein the shape of the body model is adapted by mapping shape attributes set via the interface to the shape;
    modifying frames of the digital video, based on the adapted body model; and
    outputting the digital video.

11. A method of claim 1, wherein the body model is acquired using the digital video and additional sensor equipment.

12. A method according to claim 11, wherein the additional sensor equipment is a depth camera or another scanner or device for capturing 2D or 3D static or time-varying shape, either online or off-line.

13. A method according to claim 12, wherein the additional sensor equipment is an optical motion capture system, an electromagnetic motion capture, any form of motion capture suit or an exoskeleton for pose estimation.

14. The method according to claim 10, further comprising:
    providing an interface in which a user may explicitly mark additional image points to be tracked and in which broken trajectories may be linked.

15. The method according to claim 10, wherein pose and shape parameters of the model are acquired by measuring a misalignment of a silhouette boundary of the re-projected model with a silhouette boundary of the figure.

16. The method of claim 15 wherein acquiring pose and shape parameters further comprises minimizing a misalignment between the figure in a video frame and the body model re-projected onto the video frame.

* * * * *